UNITED STATES PATENT OFFICE.

NELSON H. COOPE, OF OIL CITY, PENNSYLVANIA.

PAINT-VEHICLE.

SPECIFICATION forming part of Letters Patent No. 250,714, dated December 13, 1881.

Application filed June 28, 1880. (No specimens.)

*To all whom it may concern:*

Be it known that I, NELSON H. COOPE, of Oil City, in the county of Venango and State of Pennsylvania, have invented certain new and useful Improvements in Paint-Vehicles; and I do hereby declare that the following is a full, clear, and exact description of the invention, which will enable others skilled in the art to which it appertains to make and use the same.

My invention consists in treating a mixture of crude petroleum and melted resin with litharge to form a paint-vehicle, and also in the product resulting therefrom. Two pounds of resin are melted, and to it, while still hot, one gallon of crude petroleum is slowly added, and at the same time from one-half to a pound of litharge is stirred in. By the heat of the melted resin some of the more volatile constituents of the petroleum are driven off. After the mixture is cool and the litharge has settled, the liquid may be decanted or strained, and suitable quantities of any coloring-matters used as paints may be mixed therewith. This is of course suitable only for dark paints, as the crude petroleum is itself of a dark color.

Driers may be used in the usual way.

By crude petroleum I mean the mineral oil in its natural state as it comes from the wells.

I am aware that refined petroleum, oil obtained by distillation of bituminous coal, and petroleum reduced by distillation to a gravity of 38° or 40°, have been used as a vehicle for paints and varnishes; but these I do not employ or claim.

What I claim as my invention is—

1. The process of making a paint-vehicle by adding to melted resin crude petroleum, boiling it with litharge, and decanting or straining the resultant liquid, substantially as described.

2. The paint-vehicle consisting of a clarified combination of crude petroleum and resin, substantially as described.

NELSON H. COOPE.

Witnesses:
F. W. HAYS,
A. F. COOPE.